United States Patent [19]
Muller

[11] 3,878,241
[45] Apr. 15, 1975

[54] METHOD FOR THE SEPARATION OF ACETIC ACID BY EXTRACTIVE RECTIFICATION

[75] Inventor: Wolfgang Muller, Marl, Germany

[73] Assignee: Chemische Werke Huls AG, Marl, Germany

[22] Filed: Jan. 11, 1973

[21] Appl. No.: 322,699

[30] Foreign Application Priority Data
Jan. 15, 1972 Germany............................ 2201827

[52] U.S. Cl. ............ 260/541; 260/499; 260/526 N; 260/530 R; 260/533 R; 260/540; 260/542; 260/593 P; 260/597 R; 260/643 D
[51] Int. Cl............................................. C07c 51/48
[58] Field of Search ............ 260/541, 540, 542, 499

[56] References Cited
UNITED STATES PATENTS
2,126,611  8/1938  Britton................................. 260/541
2,313,386  3/1943  Levesque............................. 260/541

*Primary Examiner*—Vivian Garner
*Attorney, Agent, or Firm*—Krafft & Wells

[57]            ABSTRACT

In the method for separating acetic acid from water containing mixtures by extractive rectification, the improvement comprising carrying out a first step rectification with the water containing acetic acid and 1,2-dimorpholinoethane and by a second step of separating the acetic acid and 1,2-dimorpholinoethane by rectification.

7 Claims, 1 Drawing Figure

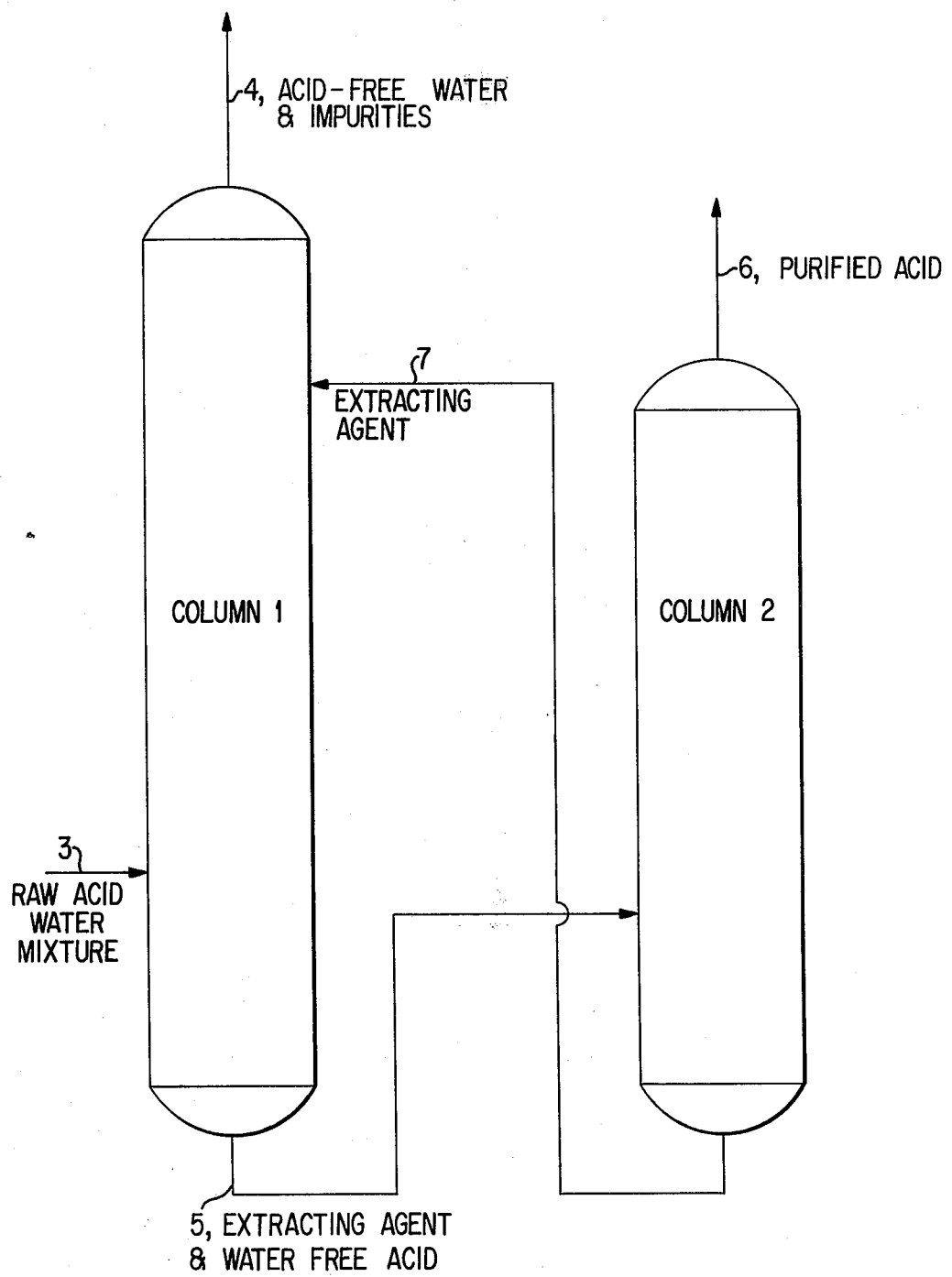

METHOD FOR THE SEPARATION OF ACETIC ACID BY EXTRACTIVE RECTIFICATION

BACKGROUND OF THE INVENTION

The field of the invention is chemistry, carboxylic acids namely acetic acid.

All methods currently employed for the production of acetic acid result in a water mixture thereof and necessitate a separation.

The state of the art of direct recovery processes for acetic acid, namely: (1) the extractive distillation process, or Suida system; (2) the cold liquid-liquid extraction process or Brewster system and its modifications; and (3) the azeotropic distillation process, or Othmer system, may be ascertained by reference to the Kirk-Othmer "Encyclopedia of Chemical Technology," Vol. 8 (1966), pages 391–393; U.S. Pat. Nos. 2,050,234 2,227,979; and 2,395,010; Othmer in Chemical Engineering Progress, Vol. 54, No. 7, July 1958, pages 48–52; and Von Garwin in Industrial and Engineering Chemistry, Vol. 45, page 1558 (1953).

The 1,2-dimorpholinoethane starting material of the present invention may be prepared in a similar way as disclosed in West German Pat. No. 1,111,189 and Chemical Abstracts, Vol. 56, page 8531 (1962).

Depending upon the particular water content of the acetic acid mixtures, various methods are employed for their separation. Azeotropic rectification with the help of a carrier is employed to separate mixtures of over 35 percent acetic acid. Ether or an ester and more rarely a hydrocarbon is employed.

The "liquid-liquid extraction" method is employed for the separation of low acetic acid concentrations of between 25–35 percent by weight in which the same solvents are employed as are used in the case of azeotropic rectification.

The use of high boiling point solvents for the extraction of acetic acid in the Suida system from carbonized wood was reported by Othmer in Chem. Eng. Progress, Vol. 54, No. 7, July 1958, pages 48–52 in which he used wood oil as the extractive agent. Later several investigators suggested derivatives of ethylene glycol as an extractive solvent. Von Garwin in Ind. Eng. Chem., Vol. 45, page 1558 (1953) suggested the use of dimethylaniline as an additive in the extractive rectification method.

In the extractive rectification method, the water-acetic acid mixture in the vapor state is passed in a counter current direction to the rising stream of the extracting liquid feed. The use of dimethylaniline as an extracting aid strongly influences the relative volatility of water and its removal from acetic acid mixtures. This method has the disadvantage, however, of forming an azeotrope which thereafter must be separated at substantial cost. The other extracting agents which have been heretofore suggested are substantially less effective. Moreover, they likewise form partial azeotropes with water or contain active groups which react with acetic acid to form chemical compounds which are inseparable by ordinary distillation procedures.

SUMMARY OF THE INVENTION

One object of the invention is to use the full advantages of extractive rectification without the disadvantage of known extracting agents which form azeotropes and chemical compounds and are less effective. The use of the compound of the invention permits more flexibility with respect to the separation of mixtures of varying concentrations.

According to the invention, separation of acetic acid from water containing mixtures is carried out by using extractive rectification in which 1,2-dimorpholinoethane is employed as the extractive agent followed by a second step of removing the 1,2-dimorpholinoethane from the acetic acid by rectification.

BRIEF DESCRIPTION OF THE DRAWING

Attached herewith is a flowsheet showing an embodiment of the apparatus for carrying out the present invention.

The rectification apparatus has columns 1 and 2. The raw acid-water mixture enters column 1 at 3. Acid free water and impurities leave the top of column 1 at 4. Extracting agent and water free acid leave the bottom of column 1 at 5 and are introduced into column 2. Purified acid leaves the top of column 2 at 6 and extraction agent is recirculated from the bottom of column 2 to column 1 by line 7.

DESCRIPTION OF THE PREFERRED EMBODIMENTS 1,2-dimorpholinoethane has the following formula:

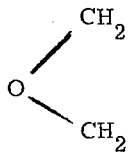 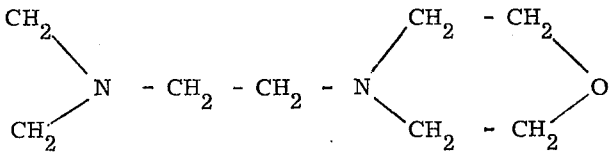

It is a cheap and easily obtainable material and is prepared by reacting 1,2-dichlorethane with morpholine. It has a boiling point of 204.8°C and a molecular weight of 200. It is believed that the nitrogen atom in the molecule is the active portion. Therefore the said compound is especially apropriate because of its low molecular weight in relation to the content of nitrogen.

A special advantage of the use of 1,2-dimorpholinoethane lies in the fact that no minimal azeotrope with water is formed. Further, salts formed with 1,2-dimorpholinoethane disintegrate completely under the conditions employed in the distillation process.

The invention has the further advantage that the extracting agent need not have any particular purity requirement. Thus, the extracting agent performs well even with raw acids containing impurities such as inorganic salts and resinification products. In this case, it is necessary to remove a portion of the extractive agent and purify it by distillation in a thin-layer evaporator before returning it to the extraction column.

The proportion of 1,2-dimorpholinoethane used in the process is dependent upon the acetic acid mixture to be separated. One can advantageously use between 170–190 kg. of 1,2-dimorpholinoethane to each 100 kg. acetic acid in the mixture to be separated. Larger proportions of the extractive agent promote faster separation. Such large portions of recirculating extractive agents are otherwise not advantageous in the process. The use of smaller proportions of the extractive agent may also be employed with its accompanying lower separating effect.

The method is useful for separation of raw acetic acid mixtures of varying acid content. The method is especially advantageous with respect to the separation of low and medium acid concentrations over the prior art methods where the acetic acid concentration varies between about 3 and 80 percent by weight. Acid concentrations of about 90 percent by weight are more advantageously separated by the use of azeotropic extraction processes. The chemical composition of the water acid mixture to be separated is dependent upon its mode of manufacture. Industrial raw acetic acid has chiefly carbonic acid, aldehydes, esters and alcohols in small quantities as impurities.

Secondary water miscible, low boiling point material such as methanol and acetone disrupt known water extraction methods. These materials segregate into the extracting agent and inhibit or influence the phase separation. This is also true in the extractive rectification of dimethylaniline. According to the teachings of the invention, however, these materials do not disrupt the separation method. These materials as well as materials which form minimum azeotropes with water such as acetic butyl ester, butanol, methylethylketone and isopropanol may be quantitatively separated from acetic acid. For example, a commercially available industrial acetic acid obtained from oxidation of hydrocarbons has the following composition:

| Acetic acid | 38.8 | percent by weight |
| formic acid | 5.3 | percent by weight |
| acetaldehyde | .22 | percent by weight |
| methylacetate | .094 | percent by weight |
| acetone | .33 | percent by weight |
| methylethylketone | .023 | percent by weight |
| sec. butanol | | |
| sec. butylacetate | .40 | percent by weight |
| formaldehyde | 200 | mg/liter |
| other, e.g. ash, salts resinous products | .12 | percent by weight |
| water | | rest |

The secondary ingredients do not disrupt the method of the invention. The performance of the separation method of the invention will be illustrated in Example 2 with respect to a similar method.

The industrial acetic acid processed according to the present invention has the following general composition:

| Acetic acid | 5 to 80 percent by weight |
| Water | 10 to 95 percent by weight |
| Formic acid | 0 to 20 percent by weight |
| Neutral substances (as defined in U.S. Pat. No. 3,394,058) | 0 to 20 percent by weight |
| Higher carboxylic acids | 0 to 20 percent by weight |

The overhead 4 from column 1 is substantially acid free water having the following general composition:

| Water | 60 to 100 percent by weight |
| Acetic acid | <0.1 percent by weight |
| 1,2-dimorpholinoethane | <0.1 percent by weight |
| Neutral substances (As defined in U.S. Pat. No. 3,394,058) | 0 to 40 percent by weight |

The sump product 5 of column 1 contains substantially extracting agent and water free acid having the following general composition:

| Acetic acid | 30 to 40 percent by weight |
| 1,2-dimorpholinoethane | 50 to 80 percent by weight |
| Water | 0 to 0.3 percent by weight |

The overhead 6 from column 2 is substantially purified acid having the following general composition:

| Acetic acid | 60 to 100 percent by weight |
| Formic acid | 0 to 20 percent by weight |
| Higher carboxylic acids | 0 to 20 percent by weight |
| Water | 0 to 1 percent by weight |

The sump product 7 of column 2 is substantially extracting agent having the following general composition:

| 1,2-dimorpholinoethane | 90 to 100 percent by weight |
| Acetic acid | 0 to 5 percent by weight |
| Higher carboxylic acid | 0 to 5 percent by weight |
| Water | 0 to 0.1 percent by weight |

The pressure at the head of the first column is generally between about 100 and 1000 mm Hg and preferably between about 100 and 760 mm Hg while the pressure at the head of the second column is generally between about 20 and 200 mm Hg and preferably between about 50 and 150 mm Hg.

Volatile acids such as formic acid, propionic acid and butyric acid remain with the acetic acid in the inventive method and may be separated by ordinary methods known in the art such as disclosed in German Pat. No. 1,204,214. The possible decomposition of formic acid during the separation process may be avoided by proper choice of conditions, for example short residence time of formic acid containing compounds at temperatures above 160°C, especially at temperatures above 200°C.

Extraction of water according to the method of the invention is generally carried out using two rectification columns, as shown in the drawing. From the first of these columns 1 a water-free mixture of acid and extracting agent 5, as well as an acid-free water 4, is removed from raw acid 3 and extracting agent 7. The acid-free water may contain low boiling point constituents which may exist in the raw acid mixture. The second rectification column 2 receives the acid 5, together with extracting agent 7, from column 1. The acid is separated from this mixture and the extractive agent is recycled back to column 1 as shown in the drawing. Raw acid-water mixture 3 is introduced as a liquid or vapor into the lower portion of column 1. Vapor state introduction over liquid state introduction is advantageous where formation of the raw acid-water mixture is in the vapor state. In this case, according to the method of the invention, the raw acid condenses in the sump of column 1 before rectification and requires only little additional energy. This is also an advantage of the method of the invention over the "liquid-liquid" method which requires cooling and condensing of the raw acid.

The extractive agent is introduced in liquid form in the top third of the rectification column 1. Suitable for the purpose is 180 kg. or about 170 to 190 kg. extractive agent, 1,2-dimorpholinoethane, per 100 kg. of acid contained in the raw acid. The back flow ratio in column 1 is in general maintained at about 0.4. Column 1 needs only 25 plates in order to maintain this ratio. In case a packed column is employed the specified backflow ratio is achieved by a sufficient height of the packing. The sump product containing the water-free acid and extracting agent is continuously conducted into the lower half of the rectification column 2. This column has about 20 plates or a corresponding particulate body height. This column will also normally be adjusted to provide a back-flow ratio of 0.4. The distillate will be water and extractive agent free. The extractive agent sump product 7 is recycled back into column 1. The extractive agent can have a small amount of acid and hardly volatile materials.

In practice both rectification columns are operated under reduced pressure since high sump temperatures cause thermal decomposition of the extractive agent and other materials usually present in the sump. This is especially true with respect to certain methods for producing raw acetic acid such as catalytic oxidation of hydrocarbons in which formic acid is usually present. The use of low pressure in the rectification column permits a lower than would otherwise be necessary temperature in the sump.

As a rule, the column 1 head pressure is held between 100 and 1,000 mm Hg, preferably less than 760 mm Hg. The head pressure of column 2 is held between about 20 and 200 mm Hg. The difference in pressure should be in particular in column 2 not greater than that employed in the ordinary vacuum column and more particularly about 1 to 2 mm Hg. per plate.

The so-called "pressure range" of the columns corresponds to the temperatures as follows:

Column 1 Column Head 50°C to 107°C
Column 1 Column Sump 120°C to 220°C
Column 2 Column Head 25°C to 80°C
Column 2 Column Sump 170°C to 230°C Under the conditions depicted slow thermal decomposition of formic acid can take place. This can be avoided by a suitable preventive measure, e.g., providing for minimal time of passage of the formic acid in the hot zones of the apparatus. It is especially necessary to closely observe areas such as the sump of column 1 where temperatures are above 160°C.

EXAMPLE 1

The apparatus corresponds to that shown by the FIGURE of the drawings. A mixture of 50 percent by weight of water and 50 percent by weight of acetic acid in the vapor state continuously flows into the 10th plate (counted from the bottom) of a rectification column 1 having altogether 23 plates. To plate 20 (counted from the bottom) is continuously conducted 0.9 parts of liquid sump product of column 2, i.e., 1,2-dimorpholinoethane per portion of water-raw acid mixture at about 89°C which is about the temperature of this plate of the column.

A pressure of 0.5 atmospheres is maintained at the head of column 1. The back-flow ratio of column 1 is 0.5, the sump temperature is 160°C and the column head temperature is held at 86°C.

The distillate consists of water with less than 0.01 percent by weight acetic acid. No trace of 1,2-dimorpholinoethane can be found in the water. The sump product consists of a mixture of acetic acid with 1,2-dimorpholinoethane containing only 0.04 percent by weight water. This sump product is likewise continuously fed in the fluid state into rectification column 2 at the 5th plate (counted from the bottom). Column 2 has altogether 15 plates. This column 2 is held at a pressure of 0.1 atmospheres at the head and a flowback ratio of 0.2. The sump temperature is held at 201°C and the head temperature is 57°C. 1,2-Dimorpholinoethane is taken from the sump together with 0.3 percent by weight acetic acid, all of which is fed back into column 1. The distillate is free of 1,2-dimorpholinoethane.

EXAMPLE 2

The apparatus used corresponds to that illustrated in the drawing. Raw acetic acid produced by oxidation of hydrocarbons is introduced at the 10th plate of a rectification column having a total of 25 plates. The acetic acid content of the raw acid mixture is 38.8 percent by weight. The total acid content of the mixture is 45.3 percent by weight which includes small proportions of formic acid, propionic acid, acrylic acid, isobutyric acid, n-butyric acid, acetaldehyde, methylacetate, acetone, methylethylketone, sec. butanol, sec. butylacetate and formaldehyde. The sump product of column 2 consisting of 96.5 percent by weight 1,2-dimorpholinoethane in a ratio of 80.2 parts by weight per 100 parts by weight raw acid-water mixture is introducted into column 1 at the 20th plate. The backflow ratio at the column head is held at 0.4 at a pressure of 380 mm Hg and a temperature of 84°C. The distillate from this column comprises less than 0.01 percent by weight total acid, figured as acetic acid, and less than 0.05 percent by weight 1,2-dimorpholinoethane. Other hydrocarbons are present to the extent of 0.915 percent by weight (calculated as carbon) of water. The sump product of column 1 consists of 34.2 percent by weight acids, figured as acetic acid, 0.057 percent by weight water and the rest 1,2-dimorpholinoethane at 165°C. This sump product is continuously introduced at plate 5, counted from below, in a rectification column having a total of 20 plates. The pressure is held at 76 mm Hg at the column head, a column head temperature of about 56°C, a sump temperature of about 199°C and a flow-back ratio of about 0.4. The distillate is acetic acid having less than 0.01 percent by weight 1,2-dimorpholinoethane, 0.4 percent by weight water and a small amount of other acids. The sump product of column 2 consists of 96.5 percent by weight 1,2-dimorpholinoethane, total acid, figured as acetic acid, of 1.66 percent by weight, acetic acid constitutes 0.01 percent by weight of this total acid and a small amount of other materials. This sump product is recycled into column 1 without intermediate purification.

EXAMPLE 3

The composition of a diluted acetic acid obtained from a raw acetic acid which is made from acetaldehyde:

22.9 percent by weight acetic acid 0.06 percent by weight formic acid
0.03 percent by weight benzol
0.03 percent by weight acetaldehyde
140 ppm. formaldehyde
rest water As in Example 1 only 41 parts of the sump product of strip column 2 is introduced per 100 parts of water-acid mixture of column 1. Water is taken off at the head of column 1 having a small proportion of acetaldehyde, formaldehyde, and benzol as well as less than 0.01 percent by weight acid, figured as acetic acid. No trace of 1,2-dimorpholinoethane can be found in this water. The acetic acid distillate from the head of column 2 comprises only 0.05 percent by weight water.

The advantage of the method of the invention over the prior art techniques lies mainly in economy. The economy is greater because of the small energy requirement and basic investment costs. The saving in energy cost is due to the fact that water-acid vapor is employed direct from the production of the same without the intermediate cooling and condensation required by fluid separating techniques. In azeotropic separation using a specific transfer agent one must, e.g., vaporize 8.3 times as much transfer agent for each part water to be distilled.

The investment costs are lower in the case of extractive rectification compared with azeotropic rectification because one can employ a column having fewer plates and a smaller diameter. The ratio of an installation cost for each is about 0.55 to 1.

A further advantage of the invention lies in that it lends itself to the separation of a greater range of acetic acid-water concentrations. A fixed proportion of extractive agent per unit of acid required is also a distinguishing feature. This is especially advantageous when separating mixtures of low acid content since other methods cost much more to treat low acid content mixtures.

A further advantage of the invention is the saving in acid purification steps since as a rule the distillate has a very high purity.

It was unexpected that the permanganate test would show impurities exceeding an acceptable level in fewer runs as compared with other extracting methods. Further purification steps can be dispensed with except for the separation of a few acids carried over with the acetic acid.

I claim:

1. In the method for separating by extractive rectification acetic acid from aqueous mixtures thereof prepared by the oxidation of hydrocarbons or acetaldehyde, said aqueous mixtures containing about 3 to 80 percent by weight of acetic acid, the improvement comprising subjecting said aqueous mixtures to extractive rectification with 1,2-dimorpholinoethane as the extractant in a first step in a first rectification column and subsequently, in a second step, separating said acetic acid from said 1,2-dimorpholinoethane by rectification in a second rectification column.

2. The method of claim 1, wherein the weight ratio of said 1,2-dimorpholinoethane to 100 parts of acetic acid in the first step is about 170 to 190.

3. The method of claim 1, wherein in the first step, at the head of the column, said first step is carried out at a pressure of 100 to 1,000 mm Hg and in the second step, at the head of the column, said second step is carried out at a pressure of 20 to 200 mm Hg.

4. The method of claim 3, wherein the first step is carried out at a pressure not more than about 760 mm Hg.

5. The method of claim 1, wherein said mixture of acetic acid and water is introduced into the first step in the vapor state.

6. The method of claim 1, wherein said 1,2-dimorpholinoethane from said second step is recycled to said first step without further purification.

7. In the method for separating by extractive rectification acetic acid from aqueous mixtures thereof, said aqueous mixtures containing about 3 to 80 percent by weight of acetic acid, the improvement comprising subjecting said aqueous mixtures to extractive rectification with 1,2-dimorpholinoethane as the extractant in a first step in a first rectification column and subsequently, in a second step, separating said acetic acid from said 1,2-dimorpholinoethane by rectification in a second rectification column.

* * * * *